US012788055B2

(12) United States Patent
Fath et al.

(10) Patent No.: US 12,788,055 B2
(45) **Date of Patent: *Nov. 10, 2026**

(54) PACKAGING SLEEVE

(71) Applicant: Altria Client Services LLC, Richmond, VA (US)

(72) Inventors: Scott Fath, Henrico, VA (US); Ryan J. Sousa, Mechanicsville, VA (US); Steven R. Rinehart, Chesterfield, VA (US)

(73) Assignee: Altria Client Services LLC, Richmond, VA (US)

( * ) Notice: Subject to any disclaimer, the term of this patent is extended or adjusted under 35 U.S.C. 154(b) by 315 days.

This patent is subject to a terminal disclaimer.

(21) Appl. No.: 17/675,279

(22) Filed: Feb. 18, 2022

(65) Prior Publication Data

US 2022/0167667 A1 Jun. 2, 2022

Related U.S. Application Data

(60) Division of application No. 16/907,438, filed on Jun. 22, 2020, now Pat. No. 11,252,998, which is a (Continued)

(51) Int. Cl.
*A24F 23/02* (2006.01)
*B31B 50/26* (2017.01)
(Continued)

(52) U.S. Cl.
CPC .............. *A24F 23/02* (2013.01); *B31B 50/26* (2017.08); *B65D 5/0209* (2013.01); (Continued)

(58) Field of Classification Search
CPC .... B31B 50/26; B65D 5/0209; B65D 5/0227; B65D 5/029; B65D 5/04; B65D 5/3621; B65D 77/0426; A24F 23/02
(Continued)

(56) References Cited

U.S. PATENT DOCUMENTS 2,217,397 A 10/1940 Armitt
2,260,428 A 10/1941 Barr
(Continued)

FOREIGN PATENT DOCUMENTS

DE 8904685 U1 8/1989
WO WO-2012138267 A1 10/2012

OTHER PUBLICATIONS

Partial International Search dated Jul. 15, 2014 for PCT/US2014/025712.

(Continued)

*Primary Examiner* — Sameh Tawfik
(74) *Attorney, Agent, or Firm* — Harness, Dickey & Pierce, P.L.C.

(57) ABSTRACT

A sleeve operable to at least partially contain a cylindrical article, the sleeve including opposing planar side panels; bowed dust flaps extending upwardly from said side panels; front and back panels, each having rounded, upper corner portions; and overlapping top panels in superposing relation to upper portions of said bowed dust flaps, said overlapping top panels being mutually secured, whereby said bowed dust flaps are retained in a bowed condition that conforms with said rounded upper panel portions of said front and back panels.

24 Claims, 6 Drawing Sheets

Related U.S. Application Data division of application No. 16/229,220, filed on Dec. 21, 2018, now Pat. No. 10,694,780, which is a continuation of application No. 15/892,619, filed on Feb. 9, 2018, now Pat. No. 10,159,276, which is a continuation of application No. 14/547,927, filed on Nov. 19, 2014, now Pat. No. 9,918,493, which is a division of application No. 13/843,449, filed on Mar. 15, 2013, now Pat. No. 8,915,365.

(51) Int. Cl.
*B65D 5/02* (2006.01)
*B65D 5/04* (2006.01)
*B65D 5/36* (2006.01)
*B65D 77/04* (2006.01)

(52) U.S. Cl.
CPC ........... *B65D 5/0227* (2013.01); *B65D 5/029* (2013.01); *B65D 5/04* (2013.01); *B65D 5/3621* (2013.01); *B65D 77/0426* (2013.01)

(58) Field of Classification Search
USPC .......................................................... 493/162
See application file for complete search history.

(56) References Cited

U.S. PATENT DOCUMENTS 2,464,154 A 3/1949 Roselius
2,856,068 A * 10/1958 Paige ................... B65D 5/5014 206/723
2,857,048 A 10/1958 Johnson
2,953,245 A 9/1960 Zastrow
3,378,137 A * 4/1968 Stone ................... B65D 5/5009 206/277
3,391,782 A * 7/1968 Kaspar ................. B65D 5/2057 426/115
3,454,157 A * 7/1969 Kulig ..................... B65D 71/16 206/499
3,469,680 A * 9/1969 Walz ...................... B65D 77/22 116/200
3,618,848 A * 11/1971 Pawlowski ........ B65D 77/0433 229/122
3,638,851 A 2/1972 Offer et al.
3,670,879 A * 6/1972 Williard ................. B65D 71/16 294/87.2
3,765,529 A * 10/1973 Mueller ................... B65D 5/16 229/122
3,807,624 A * 4/1974 Funkhouser ........... B65D 71/36 229/940
3,904,036 A * 9/1975 Forrer .................... B65D 71/36 206/427
3,912,074 A 10/1975 Vargo
4,130,202 A * 12/1978 Champlin .............. B65D 71/18 206/815
4,166,529 A * 9/1979 Adamek .................. B65D 5/32 229/122.22
4,170,295 A 10/1979 Kuehl et al.
4,200,188 A * 4/1980 Webinger ............. B65D 5/5011 206/429
4,660,720 A * 4/1987 Pugh ...................... B65D 71/14 206/427
D291,389 S 8/1987 Crymes
4,802,233 A 1/1989 Skamser
5,438,815 A 8/1995 Fleuren
5,476,215 A 12/1995 Baroud
5,642,866 A 7/1997 Nieding
5,682,986 A 11/1997 Cobler
D387,897 S 12/1997 Yorke et al.
5,794,842 A 8/1998 Hallam
5,845,776 A * 12/1998 Galbierz ................ B65D 71/48 206/427
5,850,964 A * 12/1998 Rosenbaum ......... B65D 5/3621 229/185
D435,439 S 12/2000 Jaffe et al.
6,203,035 B1 3/2001 Ondrasik
6,370,846 B1 4/2002 Schoch et al.
7,124,890 B2 10/2006 McLeod et al.
7,478,745 B2 * 1/2009 Philips ..................... B65D 5/16 206/774
7,762,450 B2 7/2010 Oliveira
8,178,823 B2 * 5/2012 Fogle ................. B65D 81/3848 219/734
8,225,985 B2 7/2012 Oliveira
8,393,465 B2 3/2013 Clark et al.
8,469,187 B2 6/2013 Wattenbarger et al.
8,517,250 B2 8/2013 Philips
8,550,093 B2 10/2013 Saint-Girons et al.
D706,642 S 6/2014 Fath
8,851,292 B2 10/2014 Meyer
8,915,365 B2 12/2014 Fath
D723,387 S * 3/2015 Fath ............................... D9/711
D806,565 S * 1/2018 Fath ............................... D9/711
9,918,493 B2 * 3/2018 Fath ..................... B65D 5/0209
10,159,276 B2 12/2018 Fath et al.
10,694,780 B2 6/2020 Fath et al.
11,745,903 B2 * 9/2023 Breitmar ................. B65B 3/025 53/491
2003/0183542 A1 * 10/2003 Bordon .................. B65D 85/06 206/304.2
2007/0199980 A1 * 8/2007 Oliveira ................... B65D 5/02 229/906
2009/0014343 A1 1/2009 Clark et al.
2009/0308779 A1 * 12/2009 Philips ..................... B65D 5/38 206/509
2010/0237137 A1 9/2010 Oliveira
2011/0315585 A1 12/2011 Meyer et al.
2012/0247986 A1 10/2012 Wattenbarger et al.
2013/0295241 A1 11/2013 Wesby et al.
2013/0334293 A1 12/2013 Coatney et al.

OTHER PUBLICATIONS

International Search Report and Written Opinion dated Oct. 6, 2014 for PCT/US2014/025712.
Office Action issued Feb. 11, 2020 in Canadian Application No. 2,905,381.

* cited by examiner

FIG. 8
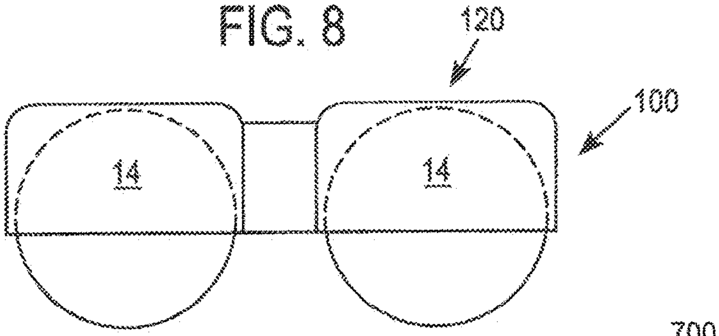
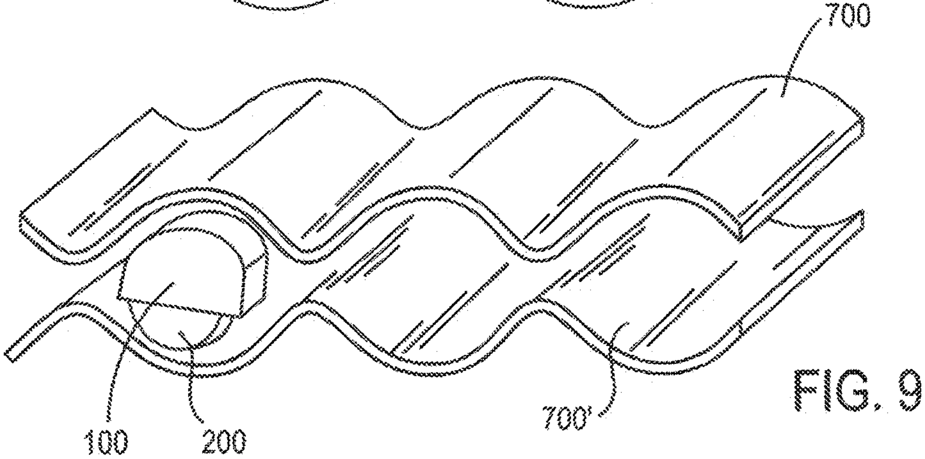
FIG. 9
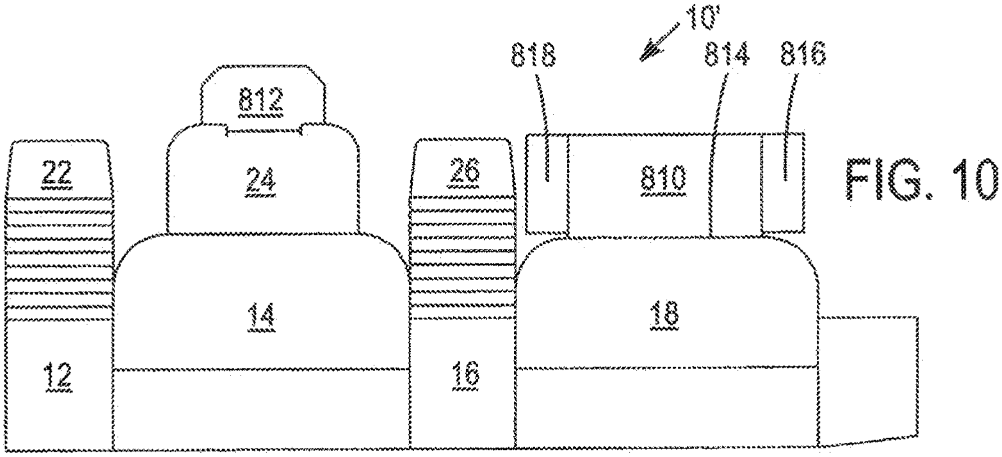
FIG. 10
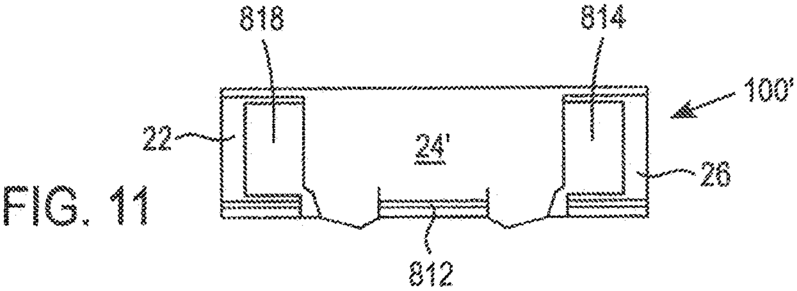
FIG. 11

PACKAGING SLEEVE

CROSS-REFERENCE TO RELATED APPLICATIONS

This application is a divisional of U.S. patent application Ser. No. 16/907,438, filed Jun. 22, 2020, which is a divisional of U.S. patent application Ser. No. 16/229,220, filed Dec. 21, 2018, which is a continuation application of U.S. patent application Ser. No. 15/892,619, filed Feb. 9, 2018, which issued as U.S. Pat. No. 10,159,276 on Dec. 25, 2018, which is a continuation application of U.S. patent application Ser. No. 14/547,927, filed Nov. 19, 2014, which issued as U.S. Pat. No. 9,918,493 on Mar. 20, 2018, which is a divisional application of U.S. patent application Ser. No. 13/843,449, filed Mar. 15, 2013, which issued as U.S. Pat. No. 8,915,365 on Dec. 23, 2014, in which the entire contents of each are incorporated herein by reference.

SUMMARY

In accordance with an exemplary embodiment, a sleeve operable to at least partially contain a cylindrical article is disclosed, the sleeve comprising: opposing planar side panels; bowed dust flaps extending upwardly from said side panels; front and back panels, each having rounded, upper corner portions; and overlapping top panels in superposing relation to upper portions of said bowed dust flaps, said overlapping top panels being mutually secured, whereby said bowed dust flaps are retained in a bowed condition that conforms with said rounded upper panel portions of said front and back panels.

In accordance with an exemplary embodiment, a display system is disclosed, comprising: a sleeve operable to at least partially contain a cylindrical article, the sleeve comprising: opposing planar side panels; bowed dust flaps extending upwardly from said side panels; front and back panels, each having rounded, upper corner portions; and overlapping top panels in superposing relation to upper portions of said bowed dust flaps, said overlapping top panels being mutually secured, whereby said bowed dust flaps are retained in a bowed condition essentially conforming with said rounded upper panel portions of said front and back panels; a cylindrical article at least partially retained within said sleeve, whereby a rounded lower portion of the article extends below a lower portion of said sleeve: and a display rack comprising a plurality of undulating display rack panels; said sleeve and said article retained in a space defined between adjacent members of said undulating panels.

In accordance with an exemplary embodiment, a blank for forming a sleeve operable to at least partially contain a cylindrical can, the blank comprises: a first side panel connected to a front panel along a first fold line, the first fold line extending along a first side edge of the front panel; a second side panel connected to the front panel along a second fold line, the second fold line extending along a second side edge of the front panel; a back panel connected to the second side panel along a third fold line, the third fold line extending along a first side edge of the back panel; a first glue panel connected to the back panel along a fourth fold line, the fourth fold line extending along a second side edge of the back panel; a first dust panel connected to the first side panel along a top edge of the first side panel; a top panel connected to the front panel along a fifth fold line, the fifth fold line extending along a top edge of the front panel; a second dust panel connected to the second side panel along a top edge of the second side panel; a second glue panel connected to the back panel along a sixth fold line, the sixth fold line extending along a top edge of the back panel; and wherein the front panel and the back panel each have a pair of rounded edges on the top edge thereof, and wherein each of the first and second dust panels has a plurality of spaced-apart parallel fold lines, which allows the first and second dust panels to have a curvature thereto upon assembly of the blank into a sleeve.

In accordance with another exemplary embodiment, a method of packaging a cylindrical can into a rounded sleeve, comprises: partially erecting the sleeve from the blank so as to have an opening at a bottom of the sleeve and an opening at a top of the sleeve; plowing the first dust panel and the second dust panel into the opening at the top of the sleeve; applying an adhesive to one or more of the top panel and the second glue panel and folding the top panel and the first glue panel over the first dust panel and the second rounded panel to close the top of the sleeve; and arranging the cylindrical can in the erected sleeve such that a side of the cylindrical can extends beyond an outer periphery of the sleeve.

In accordance with a further exemplary embodiment, a package containing a plurality of sleeves, each of which is configured to receive a cylindrical can, wherein each of the plurality of sleeves is erected from a blank comprises: a first side panel connected to a front panel along a first fold line, the first fold line extending along a first side edge of the front panel; a second side panel connected to the front panel along a second fold line, the second fold line extending along a second side edge of the front panel; a back panel connected to the second side panel along a third fold line, the third fold line extending along a first side edge of the back panel; a first glue panel connected to the back panel along a fourth fold line, the fourth fold line extending along a second side edge of the back panel; a first dust panel connected to the first side panel along a top edge of the first side panel; a top panel connected to the front panel along a fifth fold line, the fifth fold line extending along a top edge of the front panel; a second dust panel connected to the second side panel along a top edge of the second side panel; a second glue panel connected to the back panel along a sixth fold line, the sixth fold line extending along a top edge of the back panel; and wherein the front panel and the back panel each have a pair of rounded edges on the top edge thereof, and wherein each of the first and second dust panels has a plurality of spaced-apart parallel fold lines, which allows the first and second dust panels to have a curvature thereto upon assembly of the blank into a sleeve.

BRIEF DESCRIPTION OF THE DRAWINGS

The disclosure is explained below with reference to the exemplary embodiments shown in the drawings. In the drawings:

FIG. 8 is a side view of a dual sleeve packaging system in accordance with an exemplary embodiment.

FIG. 9 is a partial, detail perspective view of a display rack together with a can and sleeve in accordance with an exemplary embodiment.

FIG. 10 is a planar view of a blank of another embodiment including a tuck-flap closure.

FIG. 11 is a top view of a sleeve constructed from the blank of FIG. 10.

DETAILED DESCRIPTION

In accordance with an exemplary embodiment, a blank for forming a sleeve operable to contain a discus shaped container such as a cylindrical can is disclosed. The cylindrical can be held securely within the sleeve such that the cylindrical can fits into moist smokeless tobacco can display racks located at retail outlets. The sleeve is designed to expose the lower portion of the cans so as to prevent interference from occurring on gravity feed and rail systems used in the display racks. In addition, the visibility of portions of the cans also aids consumers in identifying the product they wish to purchase.

Figure 1A:
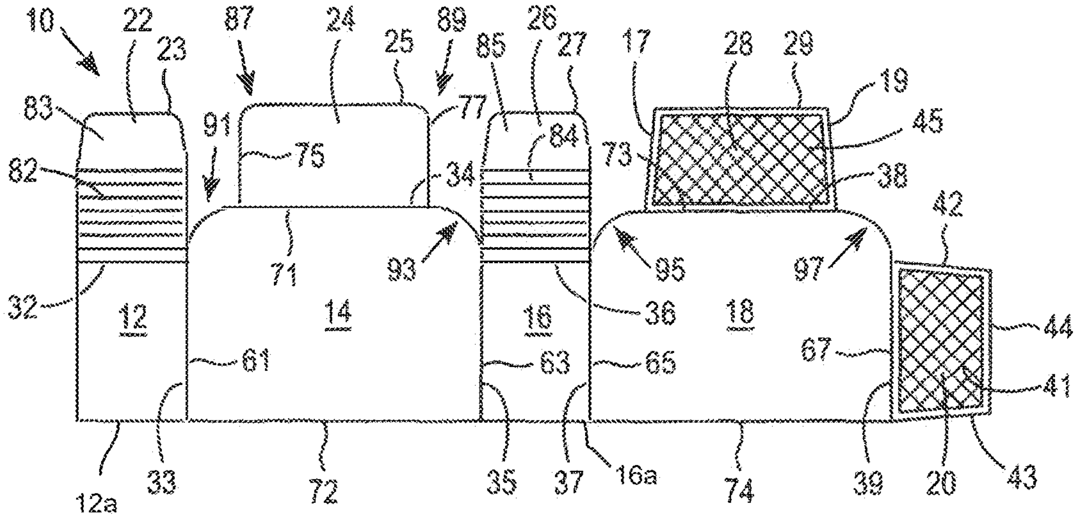
FIG. 1*a* is a blank for forming a rounded sleeve for containing a cylindrical can in accordance with an exemplary embodiment.

As shown in FIG. 1*a*, a blank 10 for forming a sleeve 100 operable to at least partially contain a cylindrical can 200 (FIG. 3) is disclosed. The blank 10 includes a first side panel 12, which is connected to a front panel 14 along a first fold line 33. The first fold line 33 extends along a first side edge 61 of the front panel 14. A second side panel 16 is connected to the front panel 14 along a second fold line 35. The second fold line 35 extends along a second side edge 63 of the front panel 14. A back panel 18 is connected to the second side panel 16 along a third fold line 37. The third fold line 37 extends along a first side edge 65 of the back panel 18. In accordance with an exemplary embodiment, a first glue panel 20 is connected to the back panel 18 along a fourth fold line 39. The fourth fold line 39 extends along a second side edge 67 of the back panel 18.

In accordance with an exemplary embodiment, a first dust panel (or first dust flap) 22 is connected to the first side panel 12 along a top edge 32 of the first side panel 12. The first dust panel 22 has a free distal end or edge 23. The top panel 24 is connected to the front panel 14 along a fifth fold line 34. The fifth fold line 34 extends along a top edge 71 of the front panel 14. A second dust panel (or second dust flap) 26 is connected to the second side panel 16 along a top edge 36 of the second side panel 16. The second dust panel 26 has a free distal end or edge 27. A second glue panel 28 is connected to the back panel 18 along a sixth fold line 38. The sixth fold line 38 extends along a top edge 73 of the back panel 18. In accordance with an exemplary embodiment, a measured distance of the top panel 24 from one outer edge 75 to another outer edge 77 is less than a diameter of a cylindrical can 200. The top panel 24 preferably has a pair of rounded edges 87, 89 along a corresponding top edge 25.

Figure 2:
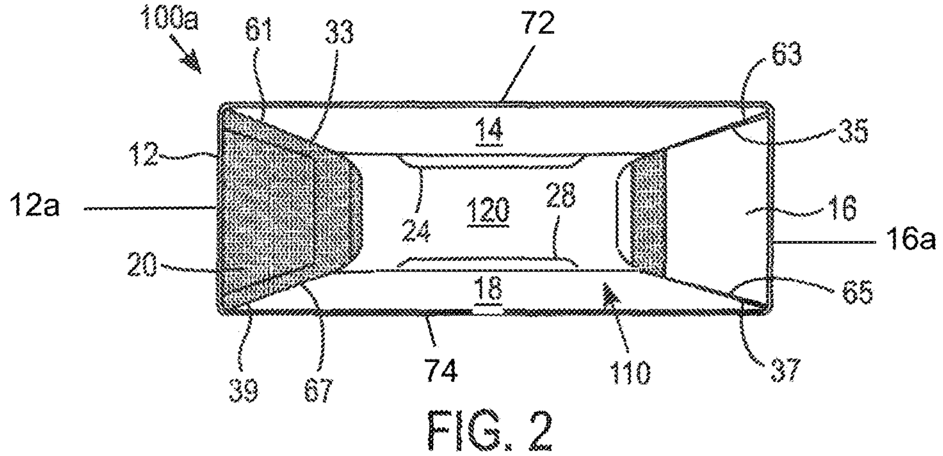
FIG. 2 is a bottom perspective view of a partially erected blank as shown in FIG. 1*a*.

In accordance with an exemplary embodiment, the front panel 14 and the back panel 18 each have a pair of rounded edges 91, 93, 95, 97 along the corresponding top edge 71, 73. The pair of rounded edges 91, 93, 95, 97 provides for a curvature or rounded edge upon assembly of the blank 10 into a sleeve 100. In addition, in accordance with an exemplary embodiment, each of the first and second dust panels 22, 26 have a plurality of spaced-apart parallel fold lines 82, 84, which extend to an outer tab portion 83, 85, which allows the first and second dust panels 22, 26 to have a curvature thereto upon assembly of the sleeve 100 (FIG. 2). In accordance with an exemplary embodiment, the outer tab portion 83, 85 is a score free portion or free of fold lines and preferably having rounded edges thereto. In accordance with an exemplary embodiment, the plurality of spaced-apart parallel fold lines 82, 84 extend from the top edge or fold line 32, 36 of the first and second side panels 12, 16, to a point or location above the top edge 71, 73 of the front and back panels 14, 18.

In accordance with an exemplary embodiment, the first and the second side panels 12, 16 have a width of about 24 mm (0.945 inches), and a height of about 35 mm (1.378 inches). The front and the back panels 14, 18 have a width of about 65.56 mm (2.581 inches) and a height of about 48 mm (1.89 inches). In accordance with an exemplary embodiment, the first and the second dust panels 22, 26 have a width of about 24 mm (0.945 inches), and a height of about (1.378 inches). The top panel 24 has a width of about 41.56 mm (1.636 inches) and a height of about 22.48 mm (0.885 inches). The first glue panel 20 has a width of about 21.5 mm (0.846 inches) and a height of about 35 mm (1.378 inches). The second glue panel 28 has a width of about 37.74 (1.486 inches) and a height of about 23 mm (0.906 inches).

In accordance with another exemplary embodiment, the first side panel 12 and the second side panel 16 can have a width of about 48 mm (1.890 inches), so as to be configured to hold two cylindrical cans 200 in a back to back relationship.

In accordance with an exemplary embodiment, the front panel 14 and the back panel 18 are substantially the same width. For example, in accordance with an exemplary embodiment, a height of the front panel 14 and a height of the back panel 18 is less than a diameter of a cylindrical can 200, such that portions of the cylindrical can 200 can extend beyond a bottom edge 72 of the front panel 14 and a bottom edge 74 of the back panel 18 when the cylindrical can 200 is inserted in an erected blank 10. In accordance with an exemplary embodiment, a bottom edge 12*a* of the first side panel 12, a bottom edge 16*a* of the second side panel 16, the bottom edge 72 of the front panel 14, and the bottom edge 74 of the back panel 18 are straight distal-most edges of the blank 10 that are collinear with each other.

In accordance with an exemplary embodiment, the blank 10 may include a finish or varnish on the clay side of the blank 10. In accordance with an exemplary embodiment, the first glue panel 20 and the second glue panel 28 each can include a varnish free area or portion 41, 45 which may improve the bonding formed by the glue, for example, a hot-melt adhesive material. In accordance with an exemplary embodiment, the first glue panel 20 has a pair of edges 42, 43, which are slightly tapered in a direction toward a vertical free edge 44. In accordance with another exemplary embodiment, the second glue panel 28 has a pair of vertical edges 17, 19, which are slightly tapered toward a horizontal free edge 29.

FIG. 2 is a bottom view of a partially erected blank 10, which forms a sleeve (or box) 100 in accordance with an exemplary embodiment. As shown in FIG. 2, The first side panel 12, the front panel 14, the second side panel 16, the back panel 18, and the first glue panel 20 are folded approximately 90 degrees about fold lines (and/or score lines) 33, 35, 37, 39. In accordance with an exemplary embodiment, the front panel 14 and the back panel 18 are folded along the second fold line 35 and the fourth fold line 39 approximately 90 degrees. The first side panel 12 and the second side panel 16 are folded along the first fold line 33 and the third fold line 37 approximately 90 degrees so that the first side panel 12 and the first glue panel overlap 20. A glue, adhesive, and/or tape is then applied to one or more of the first side panel 12 and the first glue panel 20 to adhere the first side panel 12 and the first glue panel 20 together.

In accordance with an exemplary embodiment, the partially erected sleeve (resultant box) 100*a* may be flattened to facilitate shipping or its panels 12, 14, 16, 18, and 20 may be folded and glued in a flattened form for erection at a later time such as after shipping. It is preferable that the partially erected sleeve 100*a* is supplied by the manufacture folded and glued as set forth above. However, it is preferable that the sleeves 100 or partially erected sleeves 100*a* are not packed tightly so as to flatten them completely. As shown in FIG. 2, the partially erected sleeve 100*a* includes an open bottom 110 and a partially open top 120. The partial open top 120 includes the first dust panel 22, the second dust panel 26, the top panel 24 and the second glue panel 28, which upon assembly form a closed end or top portion of the sleeve 100. In accordance with an exemplary embodiment, the bottom edge 12*a* of the first side panel 12, the bottom edge 16*a* of the second side panel 16, the bottom edge 72 of the front panel 14, and the bottom edge 74 of the back panel 18 are in a "common plane" when the blank 10 is folded into the partially erected sleeve 100*a*, as shown in FIG. 2. In accordance with an exemplary embodiment, the common plane is perpendicular to major surfaces (front and back surfaces) of the front panel 14, the back panel 18, the first side panel 12 and the second side panel 16.

Figure 1B:
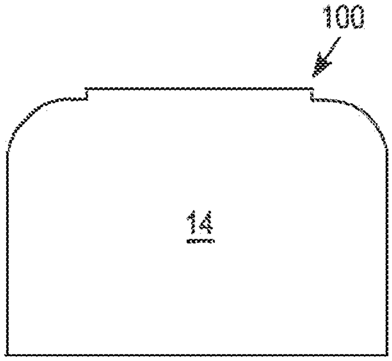
FIG. 1*b* is a side planar view of a packaging sleeve formed from a blank as shown in FIG. 1*a*.
Figure 1C:
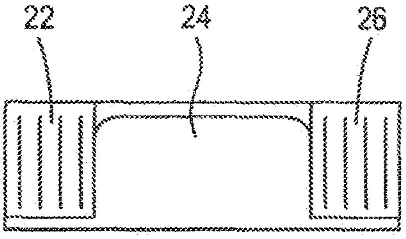
FIG. 1*c* is a top view of a packaging sleeve formed from a blank as shown in FIG. 1*a*.
Figure 3:
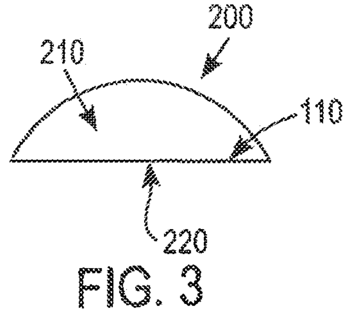
FIG. 3 is an illustration of a visible portion of a single cylindrical can within a sleeve formed from a blank as shown in FIGS. 1*a*-1*c*, and 2.

FIG. 3 is an illustration of a visible portion of a single cylindrical can 200, which is configured to fit within the sleeve 100 as shown in FIGS. 1 and 2. In accordance with an exemplary embodiment, the cylindrical can 200 fits within the sleeve 100 by friction fit, wherein the transverse size or width of the inner portion of the sleeve 100 is equal to and/or slightly smaller than an outer diameter of the cylindrical can 200.

In accordance with an alternative embodiment, the sleeve 100 can be designed to receive two or more cylindrical cans 200 arranged back to back in the sleeve 100 with a portion of each can 200 extending outward of a bottom opening in the sleeve 100. In accordance with another exemplary embodiment, two or more sleeves 100 can be attached to one another in a side-by-side manner by a panel as shown in FIG. 8. For example, in accordance with an embodiment, a connection panel (not shown) can extend between two or more sleeves 100.

In accordance with an exemplary embodiment, the cylindrical can 200 contains moist smokeless tobacco. In an exemplary embodiment, the sleeve 100 can be designed to hold two or more cylindrical cans 200. The moist smokeless tobacco in the two or more cylindrical cans 200 can be the same flavor or a different flavor of moist smokeless tobacco than in the other can 200. In addition, each of the two or more cylindrical cans 200 preferably includes indicia indicating the contents of the cans 200 and wherein the indicia is exposed upon placement in the sleeve.

In accordance with an exemplary embodiment, the cylindrical can 200 is a 1.2 ounce (oz.) can of smokeless tobacco. For example, a visible portion 210 of the cylindrical can 200 has a width 220 of about 57.09 mm and a height of about 17.75 mm. In accordance with an exemplary embodiment, the regulatory label 300 (FIG. 4) are visible on the visible portion 210 of the cylindrical can 200.

Figure 4:
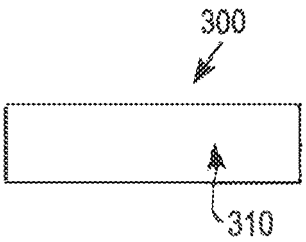
FIG. 4 is a view of an approximate size and shape of a regulatory label for a cylindrical can of moist smokeless tobacco.

FIG. 4 is a view of an approximate size of a regulatory label 300 in accordance with an exemplary embodiment, which is positioned on the front and back panels 14, 18 of the sleeve 100 that is assembled. In accordance with an exemplary embodiment, the regulatory label 300 covers at least 30 percent of each panel 14, 18. For example, in accordance with an exemplary embodiment, the total panel area of the front panel 14 and the back panel 18 is about 3,133.07 $mm^2$ with the visible portion or area of the cylindrical can 200 is about 734.7 $mm^2$. Accordingly, a total area of the front and back panels 14, 18 of the sleeve 100 that is assembled, and the visible portion or area 210 of the cylindrical can 200, is about 3,867.47 $mm^2$. In accordance with an exemplary embodiment, the regulatory label 300 has an area 310 of about 1,160.24 $mm^2$, which includes a width of about 65.56 mm and a height of about 17.70 mm. When placed on the front and back panels 14, 18 of the sleeve 100, the regulatory label 300 preferably comprises at least 30 percent of the visible area of the sleeve 100.

In accordance with exemplary embodiment, the blank 10 is formed of a material selected from the group consisting of cardboard, paperboard, plastic, metal, or combinations thereof. For example, in a preferred embodiment, the blank 10 is formed of cardboard having a weight ranging from about 100 grams per square meter to about 350 grams per square meter.

Preferably, the sleeve 100 finds particular application as a container for one or more cylindrical cans 200. Preferably, the one or more cylindrical cans 200 contain a moist smokeless tobacco product. Also preferably, each of the one or more cylindrical cans 200 has a diameter of about 66 mm. It will be appreciated that through appropriate choices of the dimensions thereof, the sleeve 100 may be designed for different numbers and/or sizes or dimensions of cylindrical cans 200, and the sizes and dimensions as set forth herein are only exemplary. For example, the size and dimensions of each of panels of the blank 10 and/or cylindrical cans 200 can be smaller or larger than the exemplary embodiments.

Preferably, the sleeve 100 has a height ranging from about 40 mm to about 55 mm, more preferably a height ranging from about 45 mm to about 49 mm, and most preferably about 47 mm. Also preferably, the height is measured from a bottom edge 72 of the front panel 14 to a top edge 71 of the front panel 14.

In the preferred embodiment, exterior surfaces of the sleeve 100 may be printed, embossed, debossed or otherwise embellished with manufacturer or brand logos, trademarks, slogans and other consumer information and indicia.

In another embodiment, a method for assembling the sleeve 100 from a single laminar blank 10 is provided. The laminar blank 10 including the one or more fold lines 33, 35, 37, 39, is first partially assembled by folding it along the transverse fold lines, which includes folding the side panels 12, 16 such that the side panels 12, 16 extending from the front panel 14 and the back panel 18 overlap on each side and gluing the first side panel 12 to the first glue panel 20 to form the sleeve 100.

Figure 5:
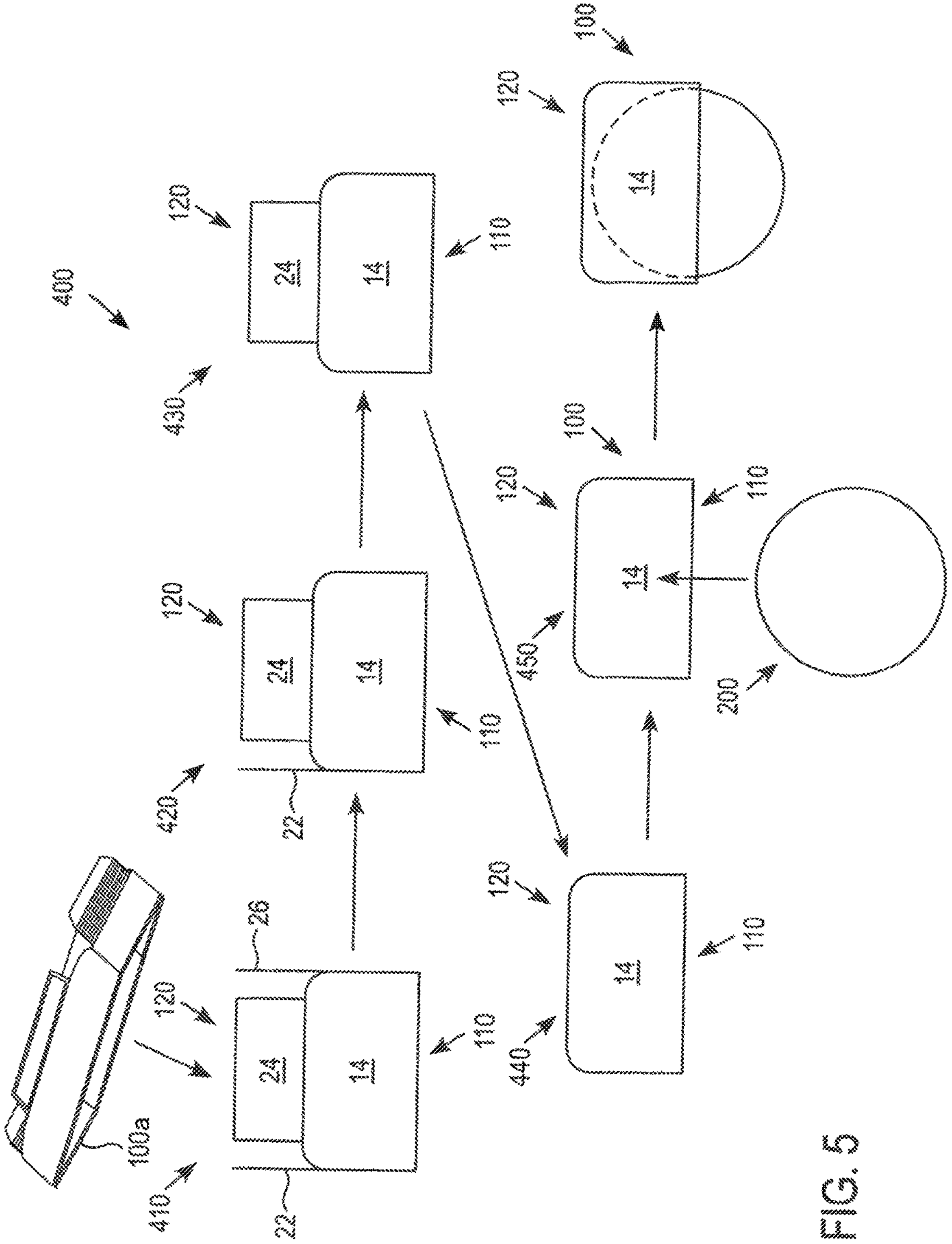
FIG. 5 is an illustration showing the assembly of a rounded sleeve being erected and an insertion of a single cylindrical can into the erected rounded sleeve in accordance with an exemplary embodiment.

Referring now to FIG. 5, in accordance with another exemplary embodiment, a method of assembling 400 a blank 10 as shown in FIG. 1 into a sleeve 100 having a cylindrical can 200 therein. The method 400 includes receiving a plurality of partially glued, un-erected sleeves, or partially erected sleeves 100*a*, which have had their side panels 12 and 16 glued together. In accordance with an exemplary embodiment, it is preferable that the partially erected sleeve 100*a* is supplied by the manufacturer folded and glued as set forth above. In addition, it is preferable that the sleeves 100 or partially erected sleeves 100*a* are not packed tightly within a box and/or shipping carton so as to flatten the sleeves 100 or partially erected sleeves 100*a* completely.

In accordance with an exemplary embodiment, the flattened blank or partially erected sleeve 100*a* is placed in box forming machine or rotating tucker, which partially erects the sleeve 100 by pressing on one or more of the first side panel 12, the front panel 14, the second side panel 16, or the back panel 18 to reform the blank into a partially erected sleeve 100*a*. The partially erected sleeve 100*a* is then fed into the forming machine or rotating tucker as shown in step 410 in an open position, wherein the first and second dust panels 22, 26 and the top panel 24 are in an open or unsealed position. In step 420, the second dust panel 26 is plowed or folded inward about the plurality of fold lines 84 closing a portion of the closed end 110 of the partially erected sleeve 100*a*. In step 430, the first dust panel 22 is plowed or folded inward about the plurality of fold lines 82 closing a second portion of the closed end 110 of the partially erected sleeve 100*a*. In step 440, the second glue panel 28 is plowed or folded inward about the sixth fold line 38 onto an upper edge or surface of the first and second dust panels 22, 26. A hot melt, glue or adhesive is then applied to the second glue panel 28, and the top panel 24 is plowed or folded about the fifth fold line 34 onto the second glue panel 28 to close the top portion of the sleeve. In step 450, one or more cylindrical cans 200 are inserted into the open end or bottom 110 of the sleeve 100. In accordance with an alternative embodiment, the one or more cylindrical cans 200 can be inserted into the open portion or bottom end 110 of partially erected sleeve 100*a* at any time during the sealing or closing of the closed portion or top end of partially erected sleeve 100*a*. In addition, the order of plowing the first and the second dust panels 22, 26 can be reversed, wherein the first dust panel 22 can be plowed or folded inward about the plurality of fold lines 82 before the second dust panel 26 is plowed or folded about the plurality of fold lines 84.

Figure 6:
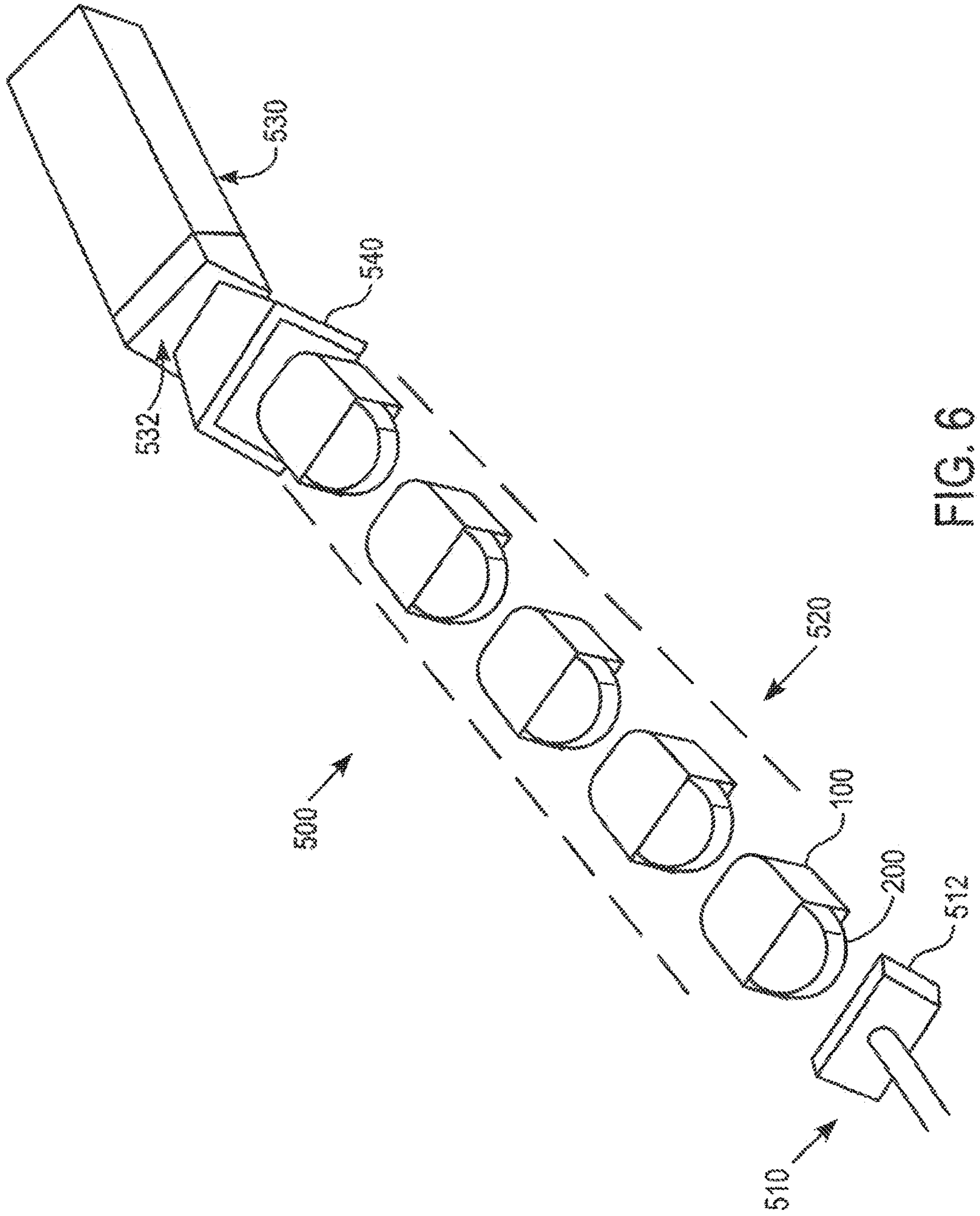
FIG. 6 is an illustration of a packaging process for one or more rounded sleeves, each containing a cylindrical can into a preformed carton.

FIG. 6 is an illustration of a packaging process 500 for one or more sleeves 100, each containing a cylindrical can 200 into a preformed carton 530. In accordance with an exemplary embodiment, a plurality of packaged sleeves 520, each of the plurality of packaged sleeves 520 containing a sleeve 100 and the cylindrical can 200 is inserted into a carton 530 in groups of preferably of five (5) sleeves 100. The plurality of packaged sleeves 520 are collated using a collator (not shown) into groups of packaged sleeves, for example, a group of five (5), on a conveyor tray or conveyor belt, and a plunger or rod 510 having a flat head 512 pushes the group of packaged sleeves 520 through a shoe or directing device 540 into an open end 532 of a preformed carton 530 in side-by-side manner. In accordance with an exemplary embodiment as shown in FIG. 5, the rounded or closed end 120 of the packaged sleeve enters into the carton 530 before the open end 110. Once the carton 530 has been filled, the open end 532 of the preformed carton 530 can be sealed and the product can be stored and/or shipped to consumers. Advantageously, feeding the sleeve 100 and can 200 with the rounded end 120 leading helps avoid snags during the loading of the carton 530.

Figure 7:
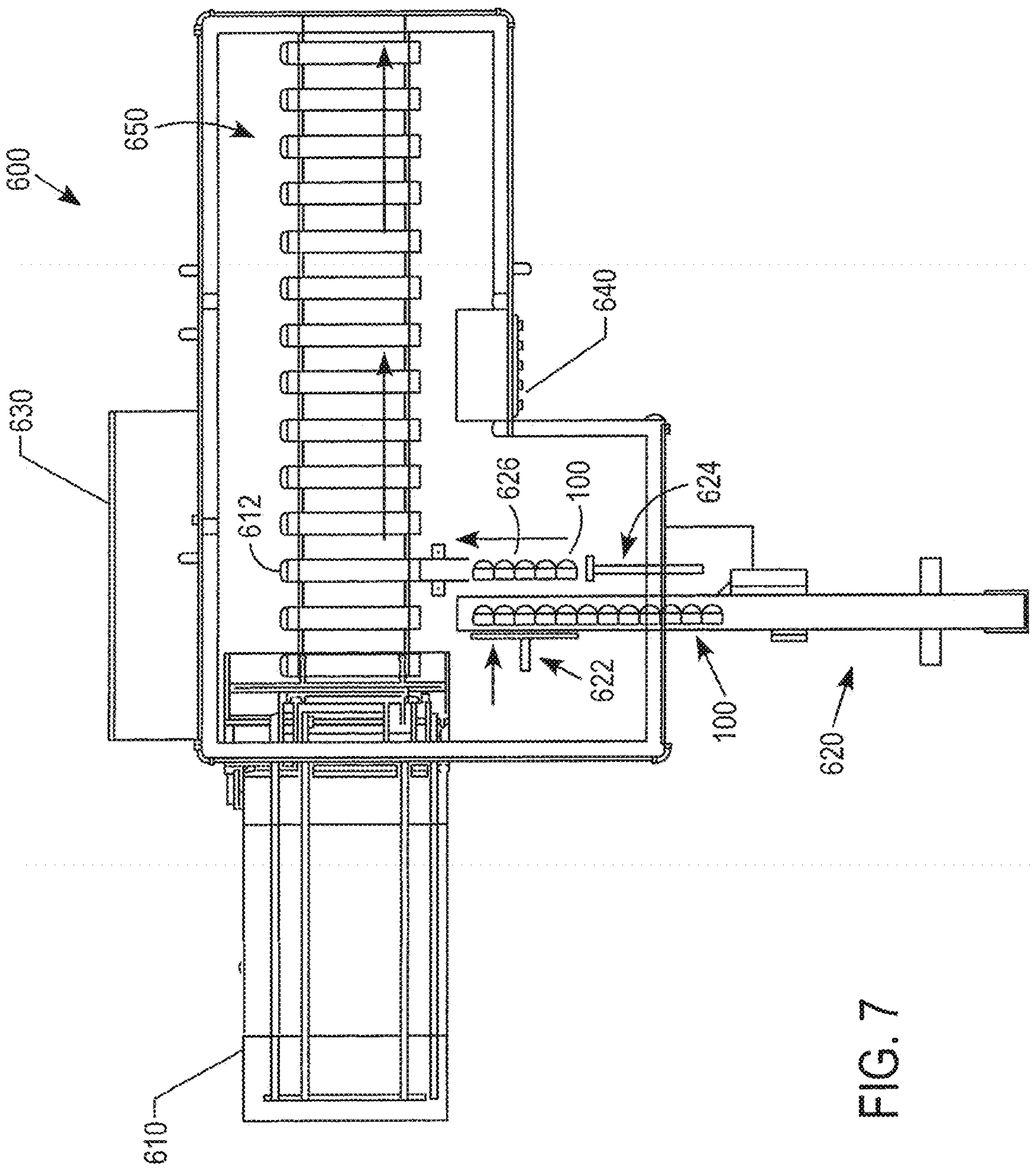
FIG. 7 is an illustration of a tobacco can packaging system in accordance with an exemplary embodiment.

FIG. 7 is an illustration of a tobacco can packaging system 600 in accordance with an exemplary embodiment. As shown in FIG. 7, the tobacco can packaging system 600 can include a powered carton magazine 610, a product infeed conveyor 620, an electrical enclosure 630, an operator interface 640 and a carton conveyor belt or system 650. The electrical enclosure 630 can include a computer processor, an operating system and software to control the operation of the tobacco can packaging system 600. In accordance with an exemplary embodiment, the operator interface 640 can include a graphical interface and/or a keyboard to assist with the operations of the various functions of the system 600.

In accordance with an exemplary embodiment, one or more packaged sleeves 520 are fed though the product infeed conveyor 620 in a single line to a collator system having a first plunger or rod 622, which separates two or more packaged sleeves 520 from the product infeed conveyor 620, and more preferably 5 packaged sleeves 100 onto a packaging tray or conveyor tray 626. Once the two or more packaged sleeves 520 and more preferably five (5) packaged sleeves 520 have been separated, the packaged sleeves 520 are pushed or advanced forward with a plunger or rod 624 into a carton 612. In accordance with an exemplary embodiment, the carton 612 is fed from the powered carton magazine 610 onto the conveyor belt or system 650. In accordance with an exemplary embodiment, the carton 612 filled with one or more packaged sleeves 520 in a side-by-side configuration within the carton 612 as the carton 612 is conveyed along the conveyor belt or system 650. Once the carton 612 has been filled, the carton advances forward along the conveyor belt or system 650 to a device (not shown) which closes the open end of each of the cartons 612 and places a plurality of cartons 612 in a box for shipping to a warehouse, retailers and/or consumers. Advantageously, the rounded, exposed portion of the can 200 and the rounded end 120 of the sleeve 100 helps avoid snags during loading of the carton 612.

Referring now to FIG. 9, the sleeve 100 (with rounded corners) and the can 200 may be sized to fit between undulating display rack panel 700, 700' without interference between the upper "corners" of the sleeve 100 and adjacent portions of the rack panels 700,700'. The rounded corners of the sleeve 100 avoid interference that would otherwise occur with sleeves of a more rectangular shape and having orthogonal upper corners.

Referring now to FIGS. 10 and 11, in another embodiment, the sleeve blank 10' includes a modified top panel 24 and an inner top panel 810 which are closed by a tuck flap 812 of the panel 24'. The tuck flap 812 cooperates with a slot 814 provided along a lower edge portion of the inner top panel 810. Preferably, the inner top panel 810 is provided with wing panels 816 and 818 which lie atop the dust flaps 22 and 26 when folded into the form of the sleeve 100'.

As used herein, the terms "front", "back", "upper", "lower", "side", "top", "bottom", "left", "right" and other terms used to describe relative positions of the components of the sleeve refer to the sleeve in an upright position.

As used herein, the term "can" refers to any disc-like container, regardless of material comprising the container and regardless of its content.

As used herein, the term "longitudinal" refers to a direction from bottom to top or vice versa of the sleeve 100. The term "transverse" refers to a direction perpendicular to the longitudinal direction.

In this specification, the word "about" is sometimes used in connection with numerical values to indicate that mathematical precision is not intended. Accordingly, where the word "about" is used with a numerical value, that numerical value should be interpreted to include a tolerance ±10% of the stated numerical value.

It will now be apparent to those skilled in the art that the foregoing specification describes with particularity a sleeve. Moreover, it will also be apparent to those skilled in the art that various modifications, substitutions, variations, and equivalents exist for claimed features of container. Accordingly, it is expressly intended that all such modifications, substitutions, variations, and equivalents for claimed features of the container, which fall within the spirit and scope of the invention as defined by the appended claims, be embraced thereby.

What is claimed is:

1. A method of using a blank, comprising:

first folding the blank to form walls of a first sleeve, the first folding including folding a front panel to oppose a back panel and folding a first side panel to oppose a second side panel, the walls defining a first opening and a second opening on a first end and a second end of the first sleeve, respectively; and second folding the blank to close the first opening, the second folding including folding at least one top panel over the first opening, straight distal-most edges of the front panel, the back panel, the first side panel and the second side panel each respectively being within a common plane and collectively defining the second opening when the first sleeve is assembled, the straight distal-most edges forming a distal- most end edge of the blank and being collinear with each other when the blank is laid out flat prior to an assembly of the blank into the first sleeve.

2. The method of claim 1, wherein the first folding folds the blank such that the walls define the second opening has a rectangular shape.

3. The method of claim 1, wherein the first folding folds the blank such that the walls define the second opening has a rectangular shape, the first sleeve and the second opening being sized to accept a portion of a cylindrical container.

4. The method of claim 1, wherein the first folding folds the blank such that the walls define the second opening has a rectangular shape, the first sleeve and the second opening being sized to accept a portion of a cylindrical container such that a first end of the cylindrical container remains extended from the second opening while a second end of the cylindrical container is contacting a portion of the at least one top panel, the common plane being perpendicular to major surfaces of the front panel.

5. The method of claim 1, wherein the first folding folds the blank such that the walls define the second opening to have a rectangular shape, the first sleeve and the second opening being sized to accept a pair of cylindrical containers in a back-to-back configuration.

6. The method of claim 1, wherein the first folding folds the blank such that the walls define the second opening to have a rectangular shape, the first sleeve and second opening being sized to accept a portion of a pair of cylindrical containers in a back-to-back configuration such that a first end of the pair of cylindrical containers remains extended from the second opening while a second end of the pair of cylindrical containers is contacting a portion of the at least one top panel, the common plane being perpendicular to major surfaces of the front panel.

7. The method of claim 1, wherein the first folding includes first connecting a first glue panel to the first side panel using at least one adhesive, the first glue panel being directly connected to a side edge of one of the front panel or the back panel.

8. The method of claim 7, wherein the second folding includes second connecting a second glue panel to a first top panel using the at least one adhesive, the second glue panel being directly connected to an end edge of one of the front panel or the back panel, the at least one top panel including the first top panel and the second glue panel.

9. The method of claim 1, wherein the second folding further includes folding a first portion of the first side panel and a second portion of the second side panel over at least a portion of the first opening, the first portion and the second portion assisting the at least one top panel in closing the first opening.

10. The method of claim 1, wherein the second folding includes folding a first top panel and a second top panel over the first opening, the at least one top panel including the first top panel and the second top panel.

11. The method of claim 1, wherein the first folding and the second folding configures the first sleeve to slideably receive at least one first cylindrical container such that a first rounded end of the at least one first cylindrical container protrudes from the second opening once the at least one first cylindrical container is fully received within the first sleeve.

12. The method of claim 11, wherein the at least one first cylindrical container is a first cylindrical container and a second cylindrical container in a back-to-back orientation.

13. The method of claim 1, further comprising:

slideably inserting at least one first cylindrical container into the second opening such that a first rounded end of the at least one first cylindrical container protrudes from the second opening once the at least one first cylindrical container is fully received within the first sleeve, the common plane being perpendicular to major surfaces of the front panel.

14. The method of claim 13, wherein the first folding and the second folding configure the first sleeve to provide a friction fit for holding the at least one first cylindrical container.

15. The method of claim 1, further comprising:

slideably inserting a first cylindrical container and a second cylindrical container into the second opening in a back-to-back orientation such that a first rounded end of the first cylindrical container and the second cylindrical container protrude from the second opening once the first cylindrical container and the second cylindrical container are fully received within the first sleeve, the common plane being perpendicular to major surfaces of the front panel.

16. The method of claim 1, further comprising:

applying at least one adhesive to at least one of a first glue panel or the first side panel, wherein the first folding includes connecting the first glue panel to the first side panel using the at least one adhesive.

17. The method of claim 1, further comprising:

applying at least one adhesive to a second glue panel, wherein the second folding includes connecting the second glue panel to a first top panel using the at least one adhesive, the at least one top panel including the first top panel and the second glue panel.

18. The method of claim 1, wherein the second folding includes folding a first distal end and a second distal end of the first side panel and the second side panel, respectively, toward the first opening to at least partially close the first opening.

19. The method of claim 18, wherein the second folding includes folding the at least one top panel over the first distal end and the second distal end to close the first opening.

20. The method of claim 18, further comprising:

applying at least one adhesive to a second glue panel, wherein the second folding includes connecting the second glue panel to a first top panel using the at least one adhesive, the at least one top panel including the first top panel and the second glue panel, the first top panel and the second glue panel being folded over at least a portion of the first distal end and the second distal end to close the first opening.

21. The method of claim 1, wherein the second folding folds the blank such that the common plane is perpendicular to respective major surfaces of the front panel, the back panel, the first side panel and the second side panel, when the first sleeve is assembled.

22. The method of claim 1, further comprising:

inserting at least one first cylindrical container into the first sleeve through the first opening, the at least one first cylindrical container having a first flat end and a second flat end that respectively contact major interior surfaces of the front panel and the back panel of the first sleeve.

23. The method of claim 1, further comprising:

inserting at least one first cylindrical container into the first sleeve through the first opening, the at least one first cylindrical container having a first part of a first flat end and a second flat end that respectively contact major interior surfaces of the front panel and the back panel of the first sleeve, an end of the at least one first cylindrical container extending from the first sleeve through the first opening with a second part of the first flat end and the second flat end extending beyond, and not contacting, the major interior surfaces of the front panel and the back panel, once the at least one first cylindrical container is fully fitted into the first sleeve.

24. The method of claim 1, wherein the second folding includes folding a first bowed dust flap and a second bowed dust flap over at least a portion of the first opening, the first bowed dust flap and the second bowed dust flap being on distal ends of the first side panel and the second side panel, respectively.

* * * * *